US008224343B2

(12) United States Patent
Wang et al.

(10) Patent No.: US 8,224,343 B2
(45) Date of Patent: Jul. 17, 2012

(54) METHOD AND SYSTEM FOR DATA RETRANSMISSION IN MBMS

(75) Inventors: Yonggang Wang, Shanghai (CN); Zhongji Hu, Shanghai (CN); Hua Chao, Shanghai (CN); Yu Chen, Shanghai (CN)

(73) Assignee: Alcatel Lucent, Paris (FR)

( * ) Notice: Subject to any disclaimer, the term of this patent is extended or adjusted under 35 U.S.C. 154(b) by 387 days.

(21) Appl. No.: 12/665,842

(22) PCT Filed: Jun. 22, 2007

(86) PCT No.: PCT/CN2007/001963
§ 371 (c)(1),
(2), (4) Date: Dec. 21, 2009

(87) PCT Pub. No.: WO2009/000101
PCT Pub. Date: Dec. 31, 2008

(65) Prior Publication Data
US 2010/0177676 A1  Jul. 15, 2010

(51) Int. Cl.
*H04Q 7/20* (2006.01)

(52) U.S. Cl. ............... 455/452.2; 455/452.1; 455/450; 370/312

(58) Field of Classification Search .............. 455/452.2, 455/450, 452.1; 370/312
See application file for complete search history.

(56) References Cited

U.S. PATENT DOCUMENTS

| 7,639,660 B2* | 12/2009 | Kim et al. | 370/343 |
| 2002/0058525 A1* | 5/2002 | Kasapi et al. | 455/526 |
| 2003/0086371 A1* | 5/2003 | Walton et al. | 370/235 |
| 2005/0138671 A1 | 6/2005 | Love et al. | |
| 2006/0133402 A1* | 6/2006 | Dottling et al. | 370/431 |
| 2007/0093262 A1* | 4/2007 | Li et al. | 455/552.1 |
| 2008/0137605 A1* | 6/2008 | Berg | 370/330 |

FOREIGN PATENT DOCUMENTS

| CN | 1522076 A | 8/2004 |
| CN | 1870468 A | 11/2006 |
| CN | 1889402 A | 1/2007 |
| CN | 1891003 A | 1/2007 |
| WO | WO 2005/032174 | 4/2005 |
| WO | WO 2005/112328 | 11/2005 |
| WO | WO 2007/069959 A1 | 1/2007 |

OTHER PUBLICATIONS

International Search Report, Dec 20, 2007.
Motorola, "E-MBMS with feedback", 3$^{rd}$ Generation Partnership Project Draft; R1-070063; 2 pages, Jun. 30, 2006.
LG Electronics, "Discussion on LTE Broadcast Y Multicast", 3$^{rd}$ Generation Partnership Project Draft; R2-061956; 3 pages, Jan. 15, 2007.
European Search Report, Dec. 20, 2207.

\* cited by examiner

*Primary Examiner* — Danh Le
(74) *Attorney, Agent, or Firm* — Fay Sharpe LLP

(57) ABSTRACT

The present invention provides a method of data retransmission in MBMS (Multimedia Broadcast/Multicast Service), comprising: a step in which a base station allocates an uplink time-frequency resource block to mobile stations; a step in which the mobile stations feed back uplink feedback signalings with respect to the received downlink MBMS service data to the base station on the allocated uplink time-frequency resource block, wherein the uplink feedback signalings with respect to one and the same downlink MBMS service data are combined in one and the same uplink time-frequency resource, and the uplink feedback signalings with respect to different downlink MBMS service data are multiplexed in one uplink time-frequency resource block; a step in which the base station decides whether to retransmit a data block based on the fed-back uplink feedback signalings.

27 Claims, 4 Drawing Sheets

METHOD AND SYSTEM FOR DATA RETRANSMISSION IN MBMS

BACKGROUND OF THE INVENTION

1. Field of Invention

The present invention relates to mobile communication field, more specifically, to a method and a system for data retransmission in MBMS (Multimedia Broadcast/Multicast Service), wherein uplink feedback signalings are multiplexed/combined in one and the same uplink time-frequency resource block to thereby save resource consumption and to avoid uplink congestion.

2. Description of Prior Art

3GPP (Third Generation Partner Project) starts a LTE (Long Term Evolution) in 2005, which is expected to provide support for increasing demand by an operator and a user at a higher data throughput and a better network performance.

MBMS was introduced in 3GPP Rel6 and is a point to multipoint service for data transmission from a data source to multiple users. The MBMS can implement sharing of resources of networks (including a core network and an access network), and can provide a service to as many as possible multimedia users having the same demand at as less as possible resources. In a radio access network (RAN), by using a common transport channel and a common radio bearer, the MBMS can implement not only low rate multicasting and broadcasting of a textual message, but also high rate multicasting and broadcasting of a multimedia service (for example, a mobile TV).

Currently, study on EMBMS (Evolved MBMS) is in progress.

The present application is generally applied to a 3GPP LTE mobile communication system based on OFDMA (Orthogonal Frequency Division Multiple Access), especially to a design of EMBMS transmission in an evolved UMTS radio access network (E-UTRAN).

EMBMS is an evolution of MBMS in 3GPP LTE. By adopting a totally different physical layer transmission technique, i.e., OFDMA transmission mode, EMBMS has many new features as compared with MBMS in WCDMA (Wideband Code Division Multiple Access) Release6 protocols.

Transmission of MBMS service can be performed in a downlink in two ways, that is, a multi-cell transmission and a single-cell transmission. The present invention involves the single-cell transmission. In case of the single-cell transmission, i.e., cell-specific point to multipoint transmission, the multicast service is independent in each cell, and synchronous transmission is not needed. A MBMS traffic channel (MTCH) can be mapped to a DL shared data channel (DL-SCH).

If a UE (User Equipment) can not receive data synchronously from multiple asynchronous cells and combine them in evolved UTRA (E-UTRA), it can not achieve the same performance as MBMS soft combination in UTRA Rel16.

In E-UTRA, DL-SCH is mainly mapped by a dedicated traffic channel (DTCH). In order to improve a peak rate of a UE unicast traffic and a system throughput, DL-SCH is characterized by using HARQ (Hybrid Automatic Repeat Request), link adaptation based on dynamically varied modulation, coding and transmit power, dynamic and semi-static resource allocation, and CQI (channel quality indicator) reporting.

When the MTCH is mapped to the DL-SCH, the DL-SCH will be broadcasted in the entire cell. In order to improve data transmission rate and to reduce a block error ratio at edge of cells, the similar method and procedure to that of transmission of the unicast service, such as HARQ, can be applied to transmission of the multicast service.

In order to obtain precise and error free data transmission in data communications, combination of FEC (Forward Error Correction) coding with ARQ (Automatic Repeat Request) is usually applied to form an error control called as HARQ. The FEC can cause a receiver to obtain a correctly received data block or to judge that an erroneous data block is received. Thereinafter, the receiver sends a feedback message to the transmitter. If the data block is correct, an ACK (Acknowledged) message is sent. If the data block is erroneous, a NACK (Not Acknowledged) message is sent. The transmitter decides whether to transmit a next data block or to retransmit the erroneously received data block based on whether the received feedback message is ACK or NACK.

In prior art, HARQ procedure is always performed on a service with respect to one UE. That is, the UE receives unicast data, and transmits a NACK message for request of retransmission via the uplink channel when it is judged that the data block is erroneous. However, in case of multicast transmission in which the data is transmitted to multiple users, if many UEs receiving the data judge that the data block is erroneous, they will send NACK messages via the uplink channel simultaneously, causing congestion on the uplink channels. In connection with characteristics of design of the physical layer in E-UTRA, the applicant finds that uplink NACK signalings with respect to a service data packet can commonly use one and the same time-frequency resource.

SUMMARY OF THE INVENTION

The present invention is proposed in order to overcome the above defects in prior art. Therefore, the present invention aims to provide a method and a system for data retransmission in MBMS, wherein uplink feedback signalings are multiplexed/combined in one and the same uplink time-frequency resource block to thereby save resource consumption and to avoid uplink congestion.

In order to implement the above aim, the present invention proposes a method of data retransmission in MBMS (Multimedia Broadcast/Multicast Service), comprising: a step in which a base station allocates an uplink time-frequency resource block to mobile stations; a step in which the mobile stations feed back uplink feedback signalings with respect to the received downlink MBMS service data to the base station on the allocated uplink time-frequency resource block, wherein the uplink feedback signalings with respect to one and the same downlink MBMS service data are combined in one and the same uplink time-frequency resource, and the uplink feedback signalings with respect to different downlink MBMS service data are multiplexed in one uplink time-frequency resource block; and a step in which the base station decides whether to retransmit a data block based on the fed-back uplink feedback signalings.

Preferably, the combining comprises causing the uplink feedback signalings with respect to one and the same downlink MBMS service data to be sent in one and the same commonly used frequency domain resource, so that all the mobile stations for one and the same multicast service share one and the same frequency domain resource.

Preferably, the frequency domain resource is a sub-carrier.

Preferably, the combining comprises causing the uplink feedback signalings with respect to one and the same downlink MBMS service data to be sent in one and the same commonly used time domain resource, so that all the mobile stations for one and the same multicast service share one and the same time domain resource.

Preferably, the time domain resource is one and the same symbol for different sub-carriers.

Preferably, all the mobile stations receiving one and the same downlink MBMS service adopt one and the same pilot scheme in the commonly used time-frequency resource for feedback of the uplink feedback signalings.

Preferably, the multiplexing comprises multiplexing the uplink feedback signalings with respect to different downlink MBMS service data in one and the same frequency domain resource block, to distinguish the uplink feedback signalings for the different downlink MBMS service data.

Preferably, the multiplexing is time division multiplexing.

Preferably, the multiplexing is frequency division multiplexing.

Preferably, the uplink feedback signalings are NACK signalings.

Preferably, when any of mobile stations in a cell detects error in data transmission for one and the same MBMS service data, a NACK signaling is fed back to the base station to indicate that the data block needs to be retransmitted.

Preferably, the NACK signaling and an ACK signaling are I-Q multiplexed and then fed back to the base station.

Preferably, the MBMS service is an evolved MBMS (eMBMS).

Preferably, the data retransmission adopts a HARQ (Hybrid Automatic Repeat Request) mechanism.

In addition, according to the present invention, it proposes a system of data retransmission in MBMS (Multimedia Broadcast/Multicast Service), comprising: a base station which allocates an uplink time-frequency resource block to mobile stations, and decides whether to retransmit a data block based on uplink feedback signalings fed-back from the mobile stations; and the mobile stations which feed back the uplink feedback signalings with respect to the received downlink MBMS service data to the base station on the allocated uplink time-frequency resource block, wherein the uplink feedback signalings with respect to one and the same downlink MBMS service data are combined in one and the same uplink time-frequency resource, and the uplink feedback signalings with respect to different downlink MBMS service data are multiplexed in one uplink time-frequency to resource block.

BRIEF DESCRIPTION OF THE DRAWINGS

By referring to the drawings in connection with description of the embodiments hereinafter, technical aim, technical scheme and advantages of the present invention become more apparent.

DETAILED DESCRIPTION OF PREFERRED EMBODIMENTS

In comparison to the unicast service, the HARQ mechanism for multicast data according to the present invention has its own characteristic. For example, the data block needs to be retransmitted when any of UEs in the cell feeds back the NACK signaling. The UE only needs to feedback the NACK signaling and can feed back it in an idle state. The uplink feedback signalings are multiplexed/combined in one and the same uplink time-frequency resource block, to thereby save resource consumption and to avoid uplink congestion.

Hereinafter, the preferred embodiments of the present invention will be described with reference to the figures.

Figure 1:
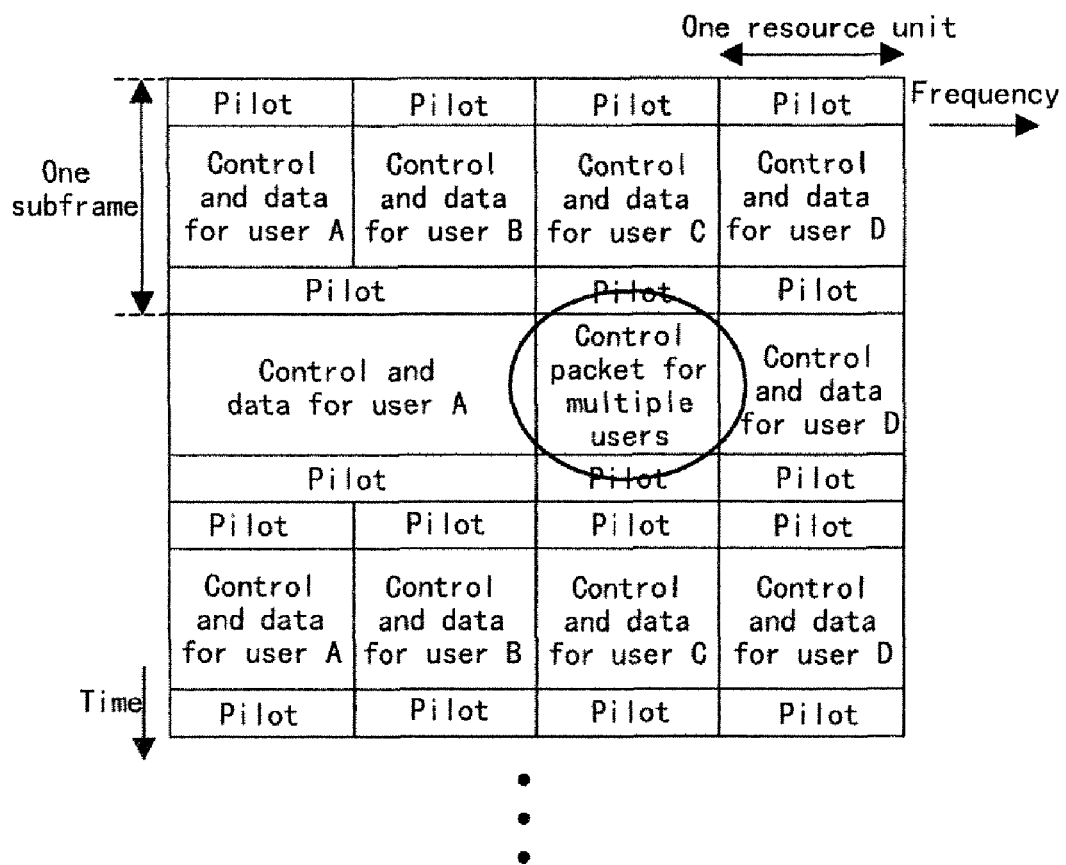
FIG. 1 is a schematic diagram illustrating that "non-data-associated" signalings for different UEs (User Equipment) are transmitted exclusively within a time-frequency domain resource.

A basic uplink transmission scheme in E-UTRA is a single-carrier transmission with cyclic prefix (CP) known as OFT-spread OFDM. In uplink, L1/L2 (Layer 1/Layer 2) controls to multiplex signalings, data and pilots within a time-frequency domain. Of the L1/L2 control signaling information, CQI and/or ACK/NACK due to downlink transmissions is a "non-data-associated" signaling. The non-data-associated signaling is not transmitted simultaneously with the data. The non-data-associated signalings for different UEs are multiplexed using a frequency/time/code or a hybrid of them and are then transmitted exclusively within a time-frequency domain resource, as indicated by the ellipse region shown in FIG. 1.

Figure 2:
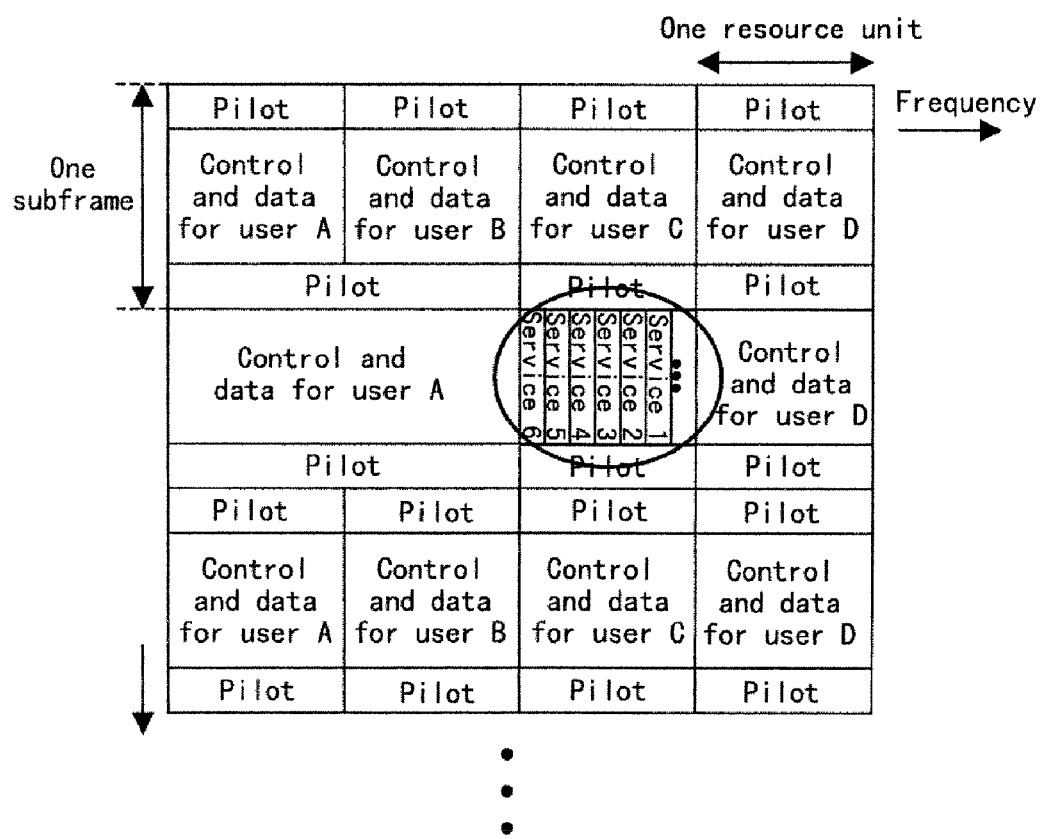
FIG. 2 is a schematic diagram illustrating that NACK signalings for one and the same downlink multicast data commonly use one frequency domain subband resource and NACK signalings for different downlink multicast data are frequency division multiplexed in one time-frequency resource block.

In one resource unit (375 kHz bandwidth), one sub-carrier allocated to uplink control signalings of multiple UEs in a multicast service is illustrated as the ellipse region in FIG. 2. As shown in the FIG. 2, NACK signalings with respect to one and the same downlink multicast service commonly use one frequency domain sub-band resource. For example, each sub-carrier is allocated for feedback of a MBMS service. Here, it should be noted that all UEs of a multicast service share one frequency domain sub-band resource. In addition, as shown in the FIG. 2, uplink feedback signalings with respect to different downlink MBMS service data are frequency-division-multiplexed in one and the same frequency domain resource block, to thereby distinguish uplink feedback signalings for the different downlink MBMS service data.

Figure 3:
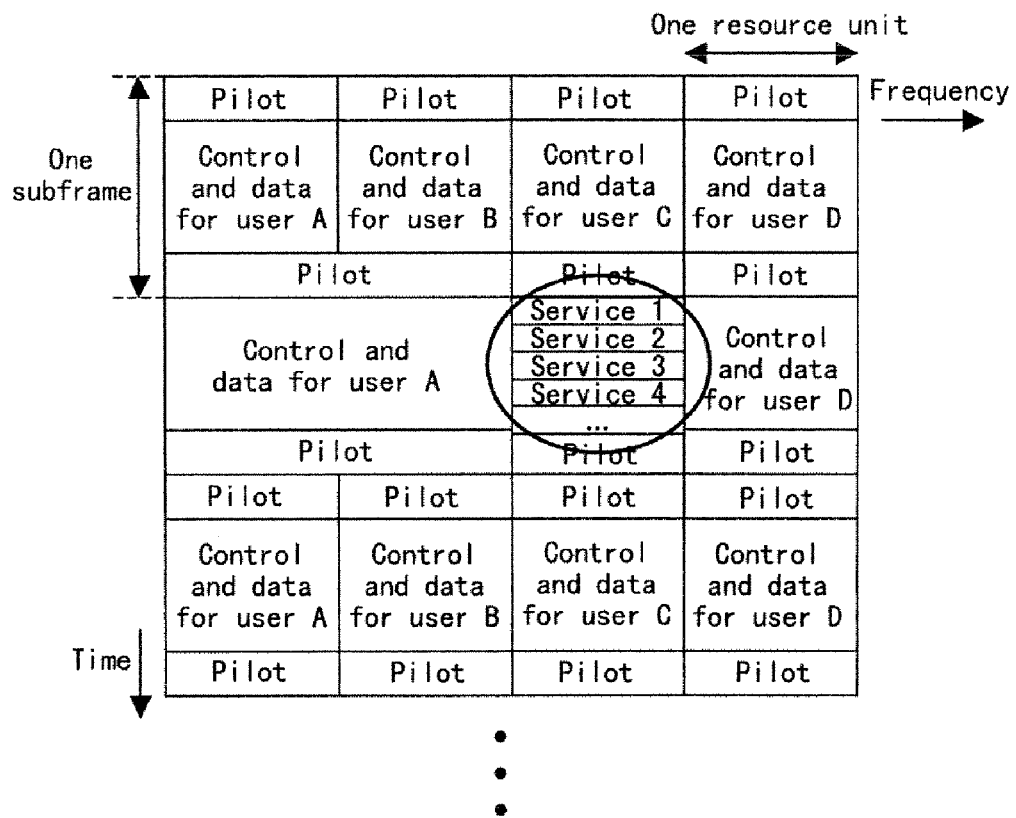
FIG. 3 is a schematic diagram illustrating that NACK signalings for one and the same downlink multicast data commonly use one time domain resource and NACK signalings for different downlink multicast data are time division multiplexed in one time-frequency resource block.

Without losing generation, as illustrated by the ellipse region in FIG. 3, NACK signalings for one and the same downlink multicast data commonly use one time domain resource. For example, one and the same symbol for different sub-carriers is allocated for feedback of one MBMS service. Here, it should be noted that all UEs of a multicast service share one time domain resource. In addition, as shown in the FIG. 3, uplink feedback signalings with respect to different downlink MBMS service data are time-division-multiplexed in one and the same frequency domain resource block, to thereby distinguish uplink feedback signalings for the different downlink MBMS service data.

From the point of OFDM, the NACK signalings from different UEs are identical. Therefore, their time domain waves are identical just with little time delay (3.3 μs for 1000-meter radius cell). To estimate the accurate channel response, all UEs use the same pilot patterns. Then, the combining of the signalings can be accomplished during radio propagation. It is transparent for eNB (Evolved NodeB). It is enough for eNB to realize that a certain UE send the NACK signaling, and re-transmit the transport block.

Figure 4:
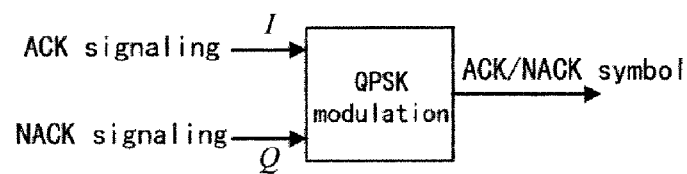
FIG. 4 is a schematic diagram illustrating that a NACK signaling and an ACK signaling are I-Q multiplexed.

The situation of NACK signaling for a downlink MBMS service in an uplink time/frequency region is indicated in MBMS control channel (MCCH). After receiving the MCCH, the UE can exactly know in what situation of the time/frequency region the NACK signaling can be fed back. If the ACK signaling also needs to be fed back to the eNB, it can be I-Q multiplexed with the NACK signaling using for example QPSK modulation, as shown in FIG. 4.

Figure 5:
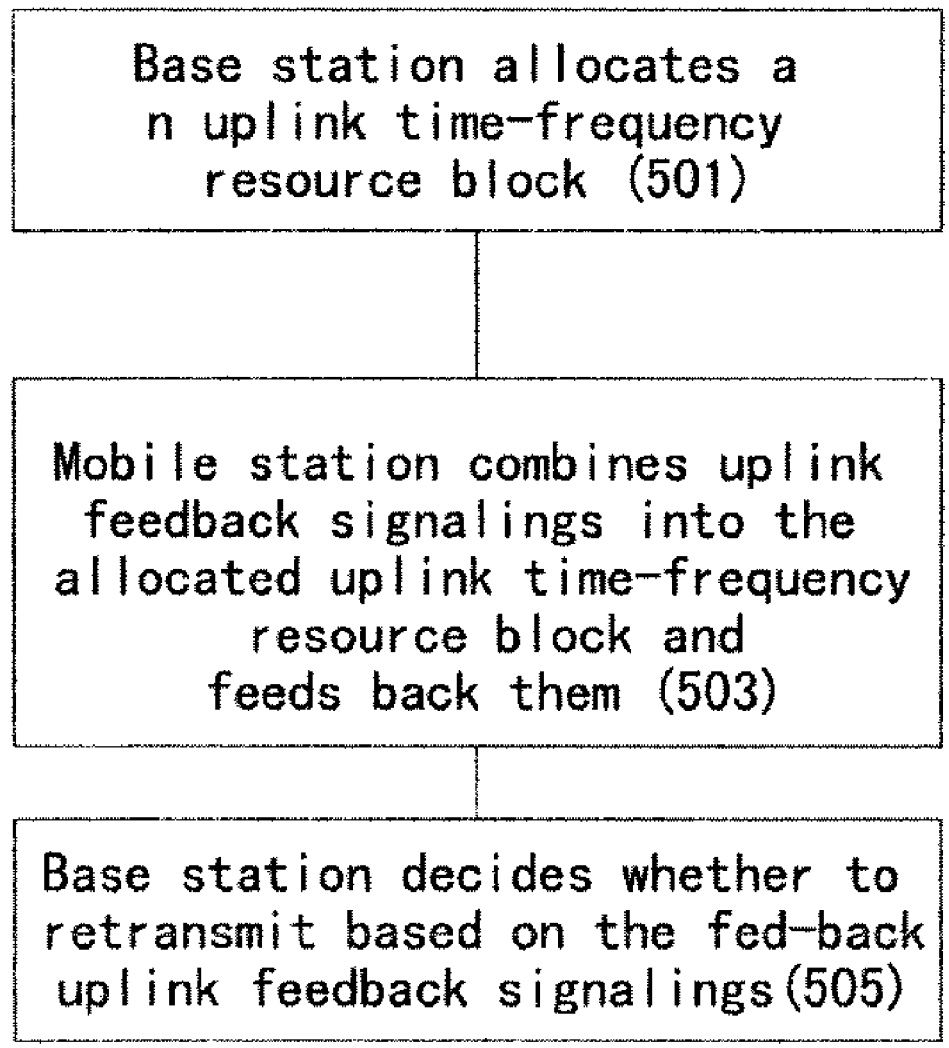
FIG. 5 is a flow diagram illustrating the method for data retransmission according to the present invention.

FIG. 5 illustrates a flow diagram of the method of data retransmission according to the present invention.

As shown in the FIG. 5, an ENB allocates an uplink time-frequency resource block to UEs at step 501. At step 503, the UEs combine uplink feedback signalings (for example, NACK signalings) with respect to the respective downlink MBMS service data within the allocated uplink time-frequency resource block and feed back them to the eNB. Herein, the uplink feedback signalings with respect to one and the same downlink MBMS service data are combined in one and the same uplink time-frequency resource, and the uplink feedback signalings with respect to different downlink MBMS service data are multiplexed in one uplink time-frequency resource block. At step 505, the eNB decides whether to retransmit the data block based on the fed-back uplink feedback signalings.

The present invention proposes a mode for HARQ different from the conventional HARQ. The present invention relates to a broadcast/multicast service, and feeds back a NACK message based on a service, rather than based on a user. All the UEs receiving one and the same service are allocated with one and the same uplink resource. By using the OFDM transmission technique, the NACK feedback signalings sent by the UEs have the same spatial wave but have only different propogation delays when reaching the eNB. The cyclic prefix (CP) window can eliminate influence due to these different delays, and combine and receive signalings from all UEs.

The method of feedback of retransmission signals according to the invention can avoid uplink congestion in case that uplink feedback channels are allocated to each user. Moreover, for the multicast service, it is only necessary for a few UEs to feedback in order to retransmit the data. The allocation of the uplink feedback channel with respect to the service according to the invention is also compliant with the point to multipoint transmission.

The above is only the preferred embodiments of the present invention and the present invention is not limited to the above embodiments. Therefore, any modifications, substitutions and improvements to the present invention are possible without departing from the spirit and scope of the present invention.

What is claimed is:

1. A method for data retransmission in MBMS (Multimedia Broadcast/Multicast Service), comprising:
   a step in which a base station allocates an uplink time-frequency resource block to mobile stations;
   a step in which the mobile stations feed back uplink feedback signalings with respect to the received downlink MBMS service data to the base station on the allocated uplink time-frequency resource block, wherein the uplink feedback signalings with respect to one and the same downlink MBMS service data are combined in one and the same uplink time-frequency resource, and the uplink feedback signalings with respect to different downlink MBMS service data are multiplexed in one uplink time-frequency resource block; and
   a step in which the base station decides whether to retransmit a data block based on the fed-back uplink feedback signalings.

2. The method according to the claim 1, wherein the combining comprises causing the uplink feedback signalings with respect to one and the same downlink MBMS service data to be sent in one and the same commonly used frequency domain resource, so that all the mobile stations for one and the same multicast service share one and the same frequency domain resource.

3. The method according to the claim 2, wherein the frequency domain resource is a sub-carrier.

4. The method according to the claim 1, wherein the combining comprises causing the uplink feedback signalings with respect to one and the same downlink MBMS service data to be sent in one and the same commonly used time domain resource, so that all the mobile stations for one and the same multicast service share one and the same time domain resource.

5. The method according to the claim 4, wherein the time domain resource is one and the same symbol for different sub-carriers.

6. The method according to the claim 1, wherein all the mobile stations receiving one and the same downlink MBMS service adopt one and the same pilot scheme in the commonly used time-frequency resource for feedback of the uplink feedback signalings.

7. The method according to the claim 1, wherein the multiplexing comprises multiplexing the uplink feedback signalings with respect to different downlink MBMS service data in one and the same frequency domain resource block, to distinguish the uplink feedback signalings for the different downlink MBMS service data.

8. The method according to the claim 7, wherein the multiplexing is time division multiplexing.

9. The method according to the claim 7, wherein the multiplexing is frequency division multiplexing.

10. The method according to the claim 1, wherein the uplink feedback signalings are NACK signalings.

11. The method according to the claim 10, wherein when any of mobile stations in a cell detects error in data transmission for one and the same MBMS service data, a NACK signaling is fed back to the base station to indicate that the data block needs to be retransmitted.

12. The method according to the claim 10, wherein the NACK signaling and an ACK signaling are I-Q multiplexed and then fed back to the base station.

13. The method according to the claim 1, wherein the MBMS service is an evolved MBMS (eMBMS).

14. The method according to the claim 1, wherein the data retransmission adopts a HARQ (Hybrid Automatic Repeat Request) mechanism.

15. A system for data retransmission in MBMS (Multimedia Broadcast/Multicast Service), comprising:
   a base station which allocates an uplink time-frequency resource block to mobile stations, and decides whether to retransmit a data block based on uplink feedback signalings fed-back from the mobile stations; and
   the mobile stations which feed back the uplink feedback signalings with respect to the received downlink MBMS service data to the base station on the allocated uplink time-frequency resource block, wherein the uplink feedback signalings with respect to one and the same downlink MBMS service data are combined in one and the same uplink time-frequency resource, and the uplink feedback signalings with respect to different downlink MBMS service data are multiplexed in one uplink time-frequency resource block.

16. The system according to the claim 15, wherein the mobile stations cause the uplink feedback signalings with respect to one and the same downlink MBMS service data to be sent in one and the same commonly used frequency domain resource, so that all the mobile stations for one and the same multicast service share one and the same frequency domain resource.

17. The system according to the claim 16, wherein the frequency domain resource is a sub-carrier.

18. The system according to the claim 15, wherein the mobile stations cause the uplink feedback signalings with respect to one and the same downlink MBMS service data to be sent in one and the same commonly used time domain resource, so that all the mobile stations for one and the same multicast service share one and the same time domain resource.

19. The system according to the claim 18, wherein the time domain resource is one and the same symbol for different sub-carriers.

20. The system according to the claim 15, wherein all the mobile stations receiving one and the same downlink MBMS service adopt one and the same pilot scheme in the commonly used time-frequency resource for feedback of the uplink feedback signalings.

21. The system according to the claim 15, wherein the mobile stations multiplex the uplink feedback signalings with respect to different downlink MBMS service data in one and the same frequency domain resource block, to distinguish the uplink feedback signalings for the different downlink MBMS service data.

22. The system according to the claim 21, wherein the multiplexing is time division multiplexing.

23. The system according to the claim 21, wherein the multiplexing is frequency division multiplexing.

24. The system according to the claim 15, wherein the uplink feedback signalings are NACK signalings.

25. The system according to the claim 24, wherein the mobile stations I-Q multiplex the NACK signaling and an ACK signaling and then feed back them to the base station.

26. The system according to the claim 15, wherein the MBMS service is an evolved MBMS (eMBMS).

27. The system according to the claim 15, wherein the data retransmission adopts a HARQ (Hybrid Automatic Repeat Request) mechanism.

\* \* \* \* \*